(12) United States Patent
Cafaro et al.

(10) Patent No.: US 10,055,099 B2
(45) Date of Patent: Aug. 21, 2018

(54) USER-PROGRAMMABLE CHANNEL STORE FOR VIDEO

(71) Applicant: Excalibur IP, LLC, Sunnyvale, CA (US)

(72) Inventors: Anthony Cafaro, New York, NY (US); Paul Nathan Schlacter, Brooklyn, NY (US); Bart Jacob Stein, New York, NY (US); Robert Michael Stein, New York, NY (US)

(73) Assignee: Excalibur IP, LLC, Sunnyvale, CA (US)

( * ) Notice: Subject to any disclaimer, the term of this patent is extended or adjusted under 35 U.S.C. 154(b) by 535 days.

(21) Appl. No.: 14/102,852

(22) Filed: Dec. 11, 2013

(65) Prior Publication Data
US 2015/0074533 A1 Mar. 12, 2015

Related U.S. Application Data

(63) Continuation-in-part of application No. 14/020,693, filed on Sep. 6, 2013.

(51) Int. Cl.

| | |
|---|---|
| *G06F 3/0482* | (2013.01) |
| *G06F 3/0484* | (2013.01) |
| *G06F 3/0486* | (2013.01) |
| *G06F 3/0488* | (2013.01) |
| *G06F 3/0481* | (2013.01) |
| *H04N 21/482* | (2011.01) |
| *H04N 21/414* | (2011.01) |
| *H04N 21/431* | (2011.01) |
| *H04N 21/442* | (2011.01) |
| *H04N 21/466* | (2011.01) |
| *H04N 21/81* | (2011.01) |

(52) U.S. Cl.
CPC .......... *G06F 3/0484* (2013.01); *G06F 3/0482* (2013.01); *G06F 3/0486* (2013.01); *G06F 3/04817* (2013.01); *G06F 3/04886* (2013.01); *H04N 21/41407* (2013.01); *H04N 21/4312* (2013.01); *H04N 21/44222* (2013.01); *H04N 21/4667* (2013.01); *H04N 21/482* (2013.01); *H04N 21/4821* (2013.01); *H04N 21/8153* (2013.01)

(58) Field of Classification Search
CPC ....... H04N 21/41407; H04N 21/431–21/4314; H04N 21/44222; H04N 21/4667; H04N 21/482–21/4821
See application file for complete search history.

(56) References Cited

U.S. PATENT DOCUMENTS

| | | | | |
|---|---|---|---|---|
| 8,073,955 | B1 * | 12/2011 | Gagnon | .................. H04H 60/25 709/203 |
| 2005/0251828 | A1 * | 11/2005 | Young | .................. G04G 15/006 725/52 |

(Continued)

*Primary Examiner* — Maryam M Ipakchi
*Assistant Examiner* — Patrick R Ramsey
(74) *Attorney, Agent, or Firm* — Cooper Legal Group, LLC

(57) ABSTRACT

A system and method for providing a more relevant user viewing experience on a mobile device includes providing a video application providing access to a virtual video channel store with selectable tiles representing digital video content sources (channels). A user is able to select channels from the virtual channel store and interact with the selections within a graphical user interface that enhances the channel viewing experience.

20 Claims, 10 Drawing Sheets

(56) References Cited

U.S. PATENT DOCUMENTS

| | | | | |
|---|---|---|---|---|
| 2009/0249418 A1* | 10/2009 | Alastruey Gracia | ........................ | |
| | | | H04N 7/17318 | |
| | | | 725/114 | |
| 2010/0251304 A1* | 9/2010 | Donoghue | ....... H04N 21/25891 | |
| | | | 725/46 | |
| 2014/0059637 A1* | 2/2014 | Chen | ..................... H04N 5/44 | |
| | | | 725/134 | |
| 2014/0123006 A1* | 5/2014 | Chen | ............... H04N 21/25891 | |
| | | | 715/716 | |
| 2014/0129932 A1* | 5/2014 | Ali | .................... G06Q 30/0643 | |
| | | | 715/702 | |

\* cited by examiner

USER-PROGRAMMABLE CHANNEL STORE FOR VIDEO

CROSS-REFERENCE TO RELATED APPLICATIONS

This application is a continuation-in-part of, and claims priority to, commonly-owned co-pending U.S. patent application Ser. No. 14/020,693, filed on Sep. 6, 2013, and entitled "Mobile Video Channel-Based Gestural User Interface;" which application is incorporated in its entirety as if fully set forth herein.

FIELD OF THE INVENTION

The invention disclosed broadly relates to the field of video applications, and more particularly relates to the field of user interfaces for video applications.

BACKGROUND OF THE INVENTION

Digital media content is available in many forms through the Internet. For example, Yahoo! Screen offers a wide selection of video content digital media items from television (TV) shows, news channels and a host of other digital content providers. The video sources are arranged in rows, with each row representing a category of video content (or "channel"). Within the rows, icons represent the different offerings per channel.

This model is very similar to the way in which TV cable companies package the channels provided to TV consumers. And, just as with TV channels, the hundreds of digital channel offerings provided to Web consumers may seem generous, but in reality this seeming abundance causes frustration because viewers must search through seemingly endless selections for the relatively few channels that interest them.

There is a need for a digital content viewing experience that addresses the above-stated shortcomings of the known art.

SUMMARY OF THE INVENTION

Briefly, according to an embodiment of the present disclosure, a method for channel viewing on a mobile device includes providing a configurable graphical user interface for channel selection and viewing on the user's mobile device. The graphical user interface includes a screen portion configured for displaying digital video content, and a channel dock. A virtual store of video channels is accessed through the channel dock and provides a grid of selectable channel tiles. The channel dock is updated with any selections of channels from the virtual store According to another embodiment of the present disclosure, an information processing system includes: a user interface configured for a mobile device (such as a touch-screen interface), a processor device, and a memory. The memory includes computer-executable instructions for providing a configurable graphical user interface for channel selection and viewing on the user's mobile device. The graphical user interface includes a screen portion configured for displaying digital video content, and a channel dock. A virtual store of video channels is accessed through the channel dock and provides a grid of selectable channel tiles. The channel dock is updated with any selections of channels from the virtual store.

BRIEF DESCRIPTION OF THE SEVERAL VIEWS OF THE DRAWINGS

To describe the foregoing and other exemplary purposes, aspects, and advantages, we use the following detailed description of an exemplary embodiment of the disclosure with reference to the drawings, in which.

Figure 1:
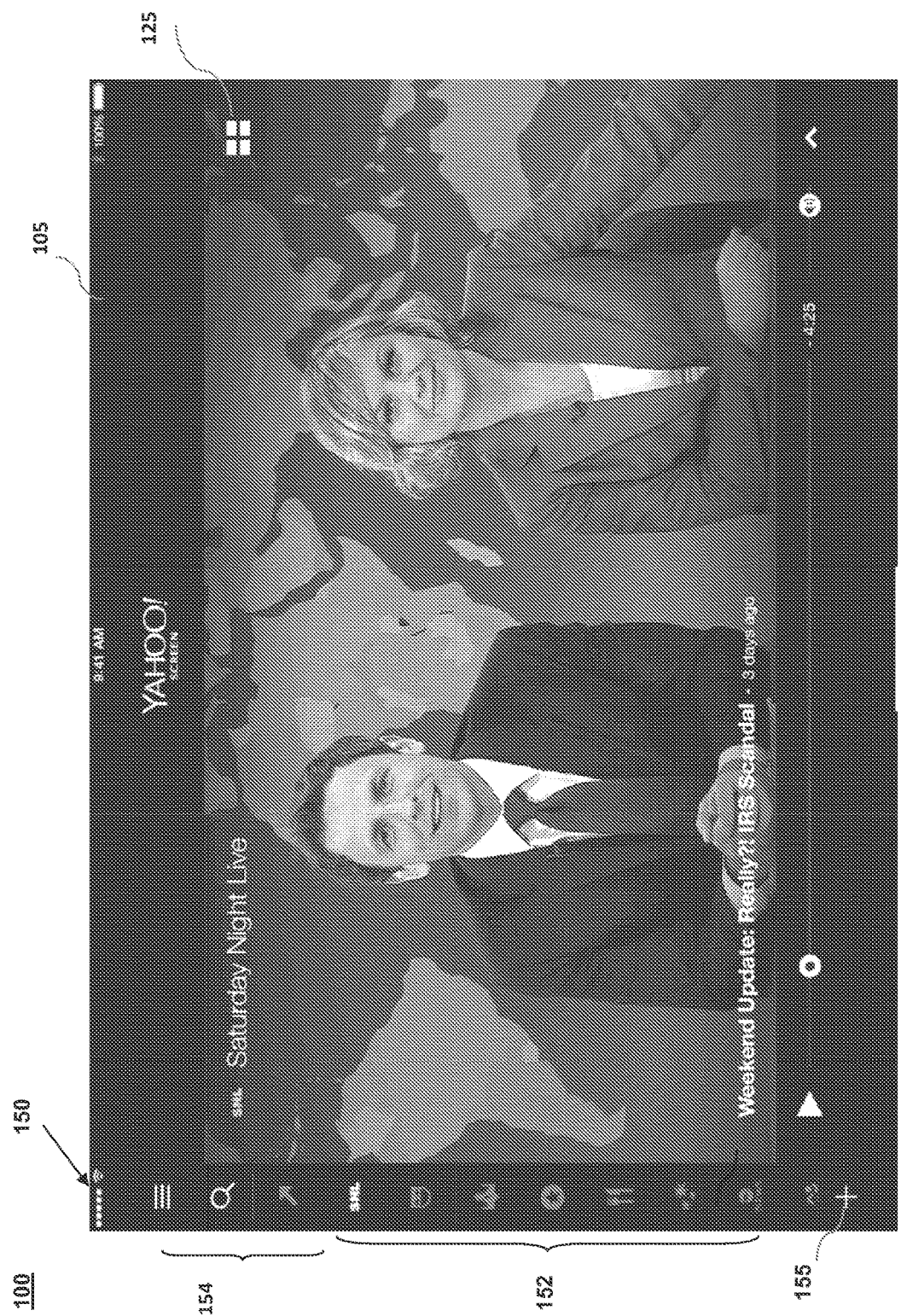
FIG. 1 shows an exemplary Channel Dock, according to an embodiment of the present disclosure.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The disclosed embodiments describe a method and graphical user interface associated with an Application for generating a store-like experience around selecting and re-ordering digital video content on a mobile device. The graphical user interface can be rendered on a device such as a mobile device when the Application is loaded. Through the use of the graphical user interface, a user may easily navigate among different information sources such video channels, as well as content items available from those information sources, such as digital video content.

In addition, the graphical user interface provided with the Video Application (App) can be configurable, enabling the user to select those information sources and/or content items to be presented via the graphical user interface. Such a configuration may be performed by establishing configuration preferences via the user device or another device. Alternatively, the configuration may be automatically generated based, at least in part, upon a user profile. In some instances, the configuration may be a default configuration.

The configuration may be associated with the user device (e.g., mobile device) via which the configuration preferences have been established, a particular user (e.g., the user who established the configuration preferences or a child of the user), or one or more specified user devices (e.g., mobile devices) to which the configuration preferences are to be applied (e.g., the user's mobile phone and tablet). The configuration preferences may be stored by a server(s). The configuration preferences may also be stored locally at the user device via which the configuration preferences have been established or the user device(s) to which the configuration preferences are to be applied.

In this disclosure, a channel is a digital video stream of content from video creators such as ABC News, Martha Stewart, Saturday Night Live, and the like. The "Channel Store" is a virtual store providing digital video channels for user consumption. Selecting/deselecting channels within the Channel Store configures a Channel Dock provided with the Video App. The Channel Dock operates like a remote control for the Video App. Although the Channel Dock is initiated with pre-loaded video channels, it is configurable to the user's personal video preferences. With the Channel Dock, viewers can effectively customize their digital content viewing experience on their mobile devices by navigating a virtual video channel store and selecting/deselecting channels as well as re-ordering them within a new viewing experience.

FIG. 1—Channel Dock Core View.

In one embodiment of the present disclosure, when a user first loads the Video App, a video channel is presented, along with the customizable Channel Dock. The Channel Dock allows mobile device users to easily discover new sources of digital video content, learn more about the content, and select/deselect the content. There are different ways to find video content of interest. For example, the Channel Store provides "Featured Channels" featuring the currently popular channels from among various categories, such as News, Sports, Comedy, and the like.

Referring now to the drawings in general and to FIG. 1 in particular, there is shown an example of the Video App Core View 100 that a user might see when first loading the Video App. The Core View 100 is divided into two main sections: a video section; and the Channel Dock 150. FIG. 1 shows a video 105 from the "Comedy" category rendered in the video section in full screen mode. On the upper right-hand side of the screen there is shown an icon 125 for entering grid view (shown in FIG. 10). To the left of the video 105 there is shown a Channel Dock 150 rendered for channel navigation. The Channel Dock 150 features navigation and viewing tools 154 for manipulating the channels, such as a "Search" feature. The Channel Dock 150 is shown here on a tablet device such as an iPad® by Apple®, but the concept can be implemented on many different platforms. The Channel Dock 150 shown here is a left-side navigation pod allowing the user to activate and interact with video channels.

Also presented on the Channel Dock 150 are multiple video icons 152 representing a subset of video channels. When the Channel Dock 150 is first accessed, it may display only a few default channel selections. As the user interacts with the Channel Store and selects/deselects and re-orders channels, the Channel Dock 150 is updated to include those video icons 152 associated with the user's personal selections.

The video channels that are associated with the Channel Dock 150 are played in the order that they are presented on the Channel Dock 150 if no other options are selected. In other words, the default mode for the Channel Dock 150 is to render the content of the video channel associated with the first video icon 152, then the next one, and so on. In addition, as shown in FIG. 1, the icon 152 associated with the currently displayed video channel is rendered in a distinguishable manner. For example, in FIG. 1 the icon for "SNL" is shown in brighter font than the other icons 152. Other ways of distinguishing an icon are contemplated within the spirit and scope of the disclosure. The user can re-order the icons 152 to change the order of the video channels, perhaps displaying a "favorite" channel first.

Up to this point, the above-stated features of the Channel Dock 150 are those described in commonly-owned, co-pending U.S. patent application Ser. No. 14/020,693. We introduce a new feature for the Channel Dock 150—an icon 155 (shown here as a "+" sign) for entry into the Channel Store View (an example of which is shown in FIG. 2).

Channel Dock 150. The Channel Dock 150, shown in FIG. 1 as a vertical channel strip, enables a user to easily switch channels from a plurality of different video channels by tapping the channel icons 152 on the Channel Dock 150, where each of the plurality of different channels is represented as a different icon 152 on the vertical channel strip. The user may submit input with respect to the Channel Dock 150, where the input indicates a direction of navigation with respect to the plurality of rows. For example, the user may click or swipe the Channel Dock 150 to navigate among the plurality of channels. As the user swipes or otherwise interacts with the Channel Dock 150, the channel may be automatically changed. In addition, as the channel is changed, the content item (e.g., video) that is rendered via the device may also be automatically changed. For example, the first content item (e.g., video) for that row may be provided. As another example, where a content item in that channel was previously being consumed, rendering of the content item may resume at a point at which the user previously stopped or paused the content item (e.g., video).

In this example, the Channel Dock 150 is a vertical channel strip shown as a rectangular region displayed along the left side of the rows of channel icons, where the rectangular region extends substantially along the height of the display. Although the Channel Dock 150 is shown at the left side of the display in this example, this example is merely illustrative. Thus, the Channel Dock 150 may be presented in a different position. In addition, the Channel Dock 150 need not be displayed within the graphical user interface 100 to enable the user to change channels using a gesture such as a swiping gesture.

Figure 2:
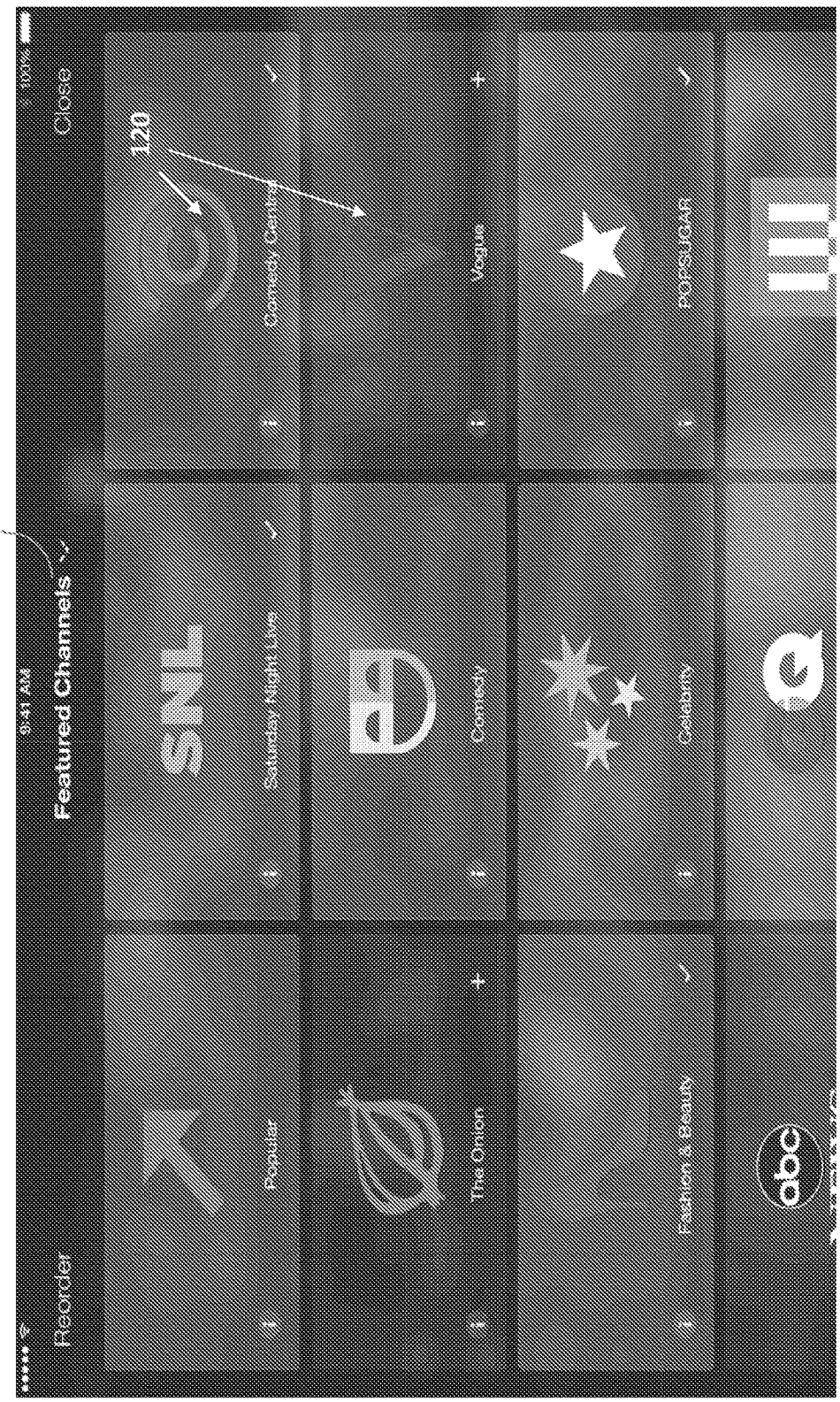
FIG. 2 provides a gallery view of video channel store tiles in a channel view graphical user interface, according to an embodiment of the present disclosure.

FIG. 2 Channel Store View.

FIG. 2 is an exemplary graphical user interface of the Channel Store View 110 through which a user may select or purchase one or more video channels from a plurality of channels. As stated above with respect to FIG. 1, tapping the Channel Store View icon 155 (shown here as a plus sign "+") in the Channel Dock 150 renders the Channel Store View 110. In this view, the user can select a video channel from a grid of selectable channels in the Channel Store. The channels are presented as selectable tiles 120 that hover over the screen. The tiles 120 can be semi-transparent as shown in FIG. 2 and feature branded icons that identify the channels. In some embodiments, advertisements can be served within the channel tiles. Information about a particular show can be provided once the user has selected the channel and is viewing the channel content. Closing out of the Channel Store View 110 brings the user back to the core Video App view of FIG. 1.

In some embodiments, as the user navigates among the tiles, a content item may be automatically rendered. In other embodiments, the rendering of a content item may be triggered via a gesture or other input of the user, such as a single or double tap on the icon representing the content item.

The user may also choose to zoom in or out on a particular content item. This may be accomplished, for example, by performing a pinching or spreading gesture with respect to the corresponding icon rendered in the graphical user interface.

The user interface rendered with the Video App may render a content item after selection of the content item or after zooming in on the content item. In the core view 100 shown in FIG. 1, the content item may be rendered in substantially the entire display area of a display of the device. The Channel Dock 150 or vertical channel strip may continue to be displayed after or while a content item is being rendered via the user device. At any time, the user may choose to interact with the vertical channel strip (e.g., channel icon), which may enable the user to change channels or access the gallery view 110 of the Channel Store shown in FIG. 2.

Figure 4:
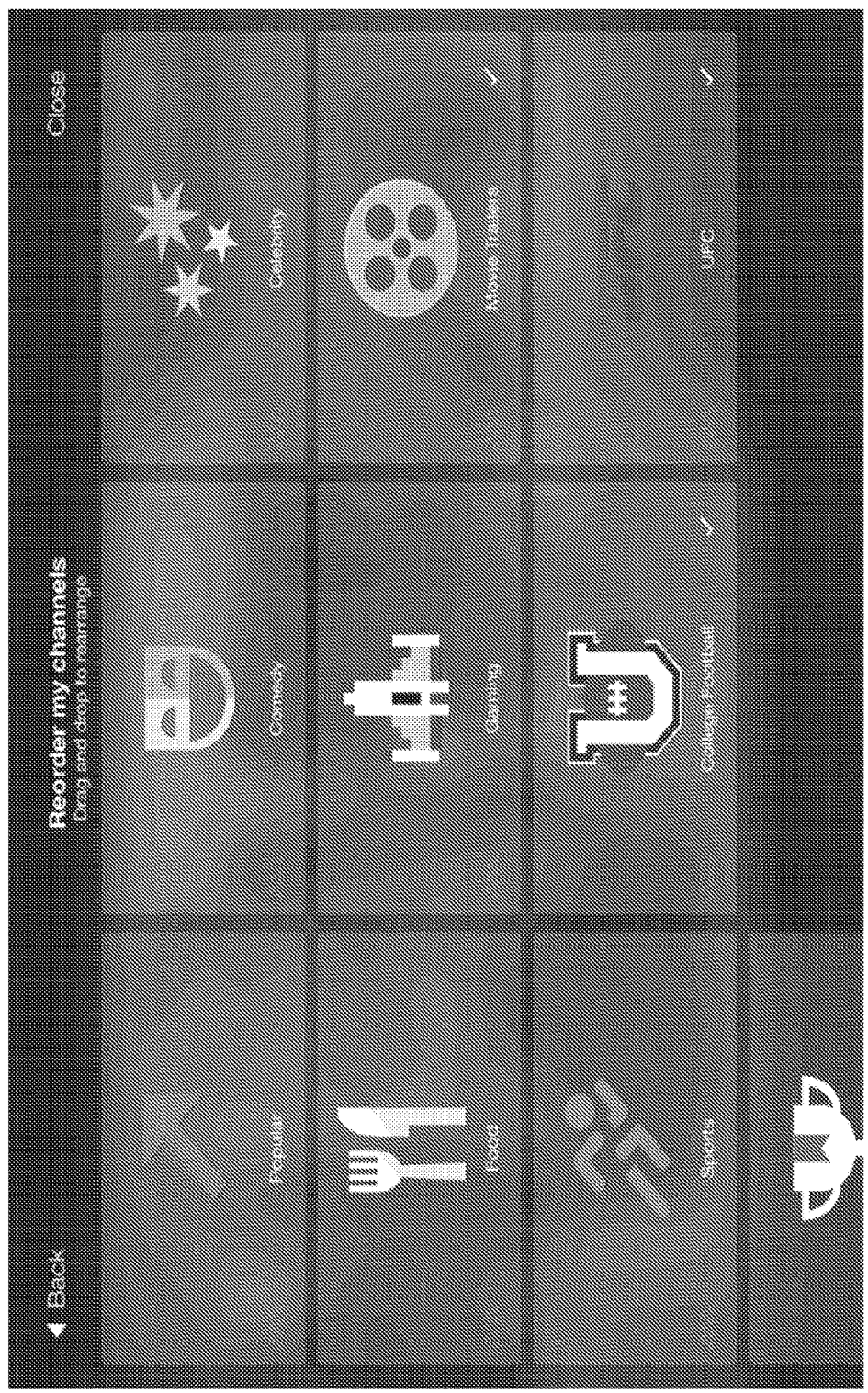
FIG. 4 shows an exemplary illustration of re-ordered channel tiles, according to an embodiment of the present disclosure.
Figure 5:
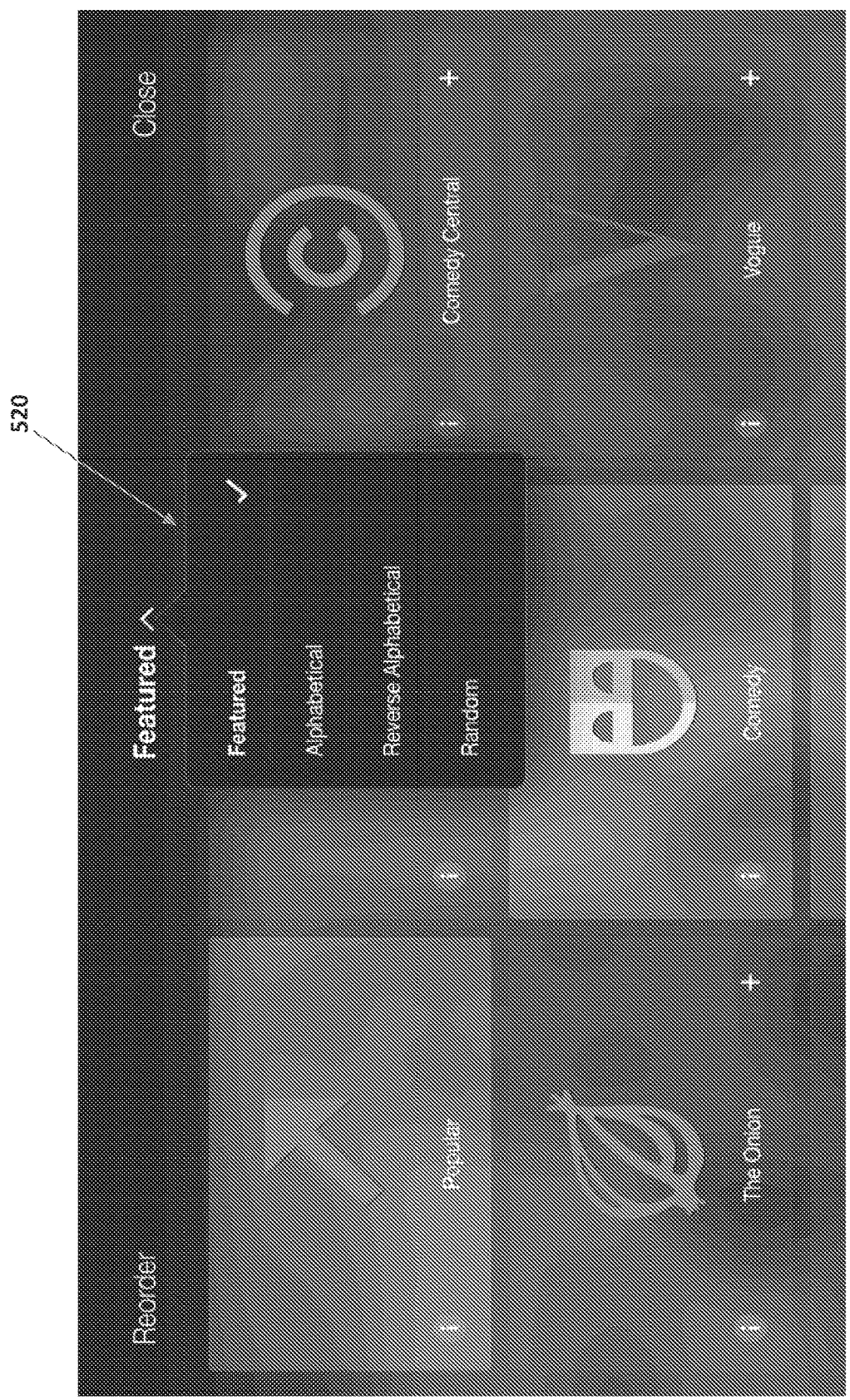
FIG. 5 shows an exemplary close-up illustration of the channel sort feature, according to an embodiment of the present disclosure.

An advantage of the Channel Store View 110 is the ability to re-order the selected channel tiles 120. This can be done by dragging and dropping the tiles 120 into place as shown in FIG. 4 or by selecting the drop-down menu of sorting options 520 as shown in FIG. 5. The tiles 120 can be sorted in alphabetical order, by content, recently added, most popular, or a number of other ways.

In one embodiment, each of the information sources corresponds to a different source of videos. For example, some of the tiles may correspond to television channels, some tiles may correspond to web sites such as Flickr. Where an information source corresponds to a television channel, each content item may correspond to a show or an episode of a show. More particularly, the content item may include a video or video clip. For example, a video may include a show, while a video clip may include a portion of a show such a sound byte or scene. A content item may be identified by a title of the show, and may be further identified by a title of a particular episode of the show. For example, an icon representing the content item may include one or more titles such as a title of a show and/or specific episode. In addition, the channel may be identified in association with each of the rows. For example, the icon of a content item may identify the channel offering the content item. As another example, the first icon within a given row may identify the channel associated with that row.

In accordance with various embodiments, a user may scan and browse content associated with information sources much like the familiar way in which they browse television content. More particularly, the user may perform a gesture such as a vertical (e.g., upward or downward) swiping gesture to navigate (e.g., scroll) among the rows corresponding to various different information sources. In this example, four different rows corresponding to four different information sources are illustrated. However, the configuration may include any number of information sources. Where the configuration includes more information sources and therefore more rows than can be presented at the same time via the display, the user can perform a vertical swiping gesture to scroll among the rows of icons within a larger grid. In this manner, a user may flip between channels of content.

FIG. 10—Grid View.

Figure 10:
FIG. 10 presents a grid view of the Video App interface, according to an embodiment of the present disclosure.

According to another embodiment of the present disclosure, the core Video App view can be presented as a Grid View 1000, rather than as a single video screen 105 as shown in FIG. 1. The Grid View 1000 is activated by selecting the grid icon 125 from the Channel Dock 150. When the Grid View 1000 is selected, the video screen portion 105 of the user interface displays a grid view 1000 of multiple channels from the Channel Dock 150 as shown in FIG. 10. You will note that although the Channel Dock 150 shows at least eight different icons 152 representing channels, the grid view 1000 shown here displays only four of those channels to accommodate screen size. The other channels can be selected by scrolling. It should be noted that the four icons 152 (SNL, Comedy, Gaming, and PopSugar) that are highlighted on the Channel Dock represent a one-to-one correspondence with the four channels that are currently active on the screen 1000. As the user scrolls up or down the icons 152 on the Channel Dock 150, selecting or re-ordering channels, the grid view 1000 will change accordingly, showing the channels associated with the featured icons 152. Conversely, changing the order of the channels in the grid re-orders the channel icons 152 in the Channel Dock 150.

This grid view 1000 representation of the Video App displays images 1020 (such as thumbnail images) representing the channels that the user has selected and may also feature recommended channels. As previously stated, the Video App will initially present default channels. Each image 1020 in the grid view 1000 is selectable for viewing and supports multiple commands. Selection of an image 1020 for viewing will cause that video content to be rendered on the device, in the same manner that selection of a tile 120 from the Channel Store View 110 will cause that video content to be rendered. The images 1020 can be selected/deselected by tapping.

Figure 3:
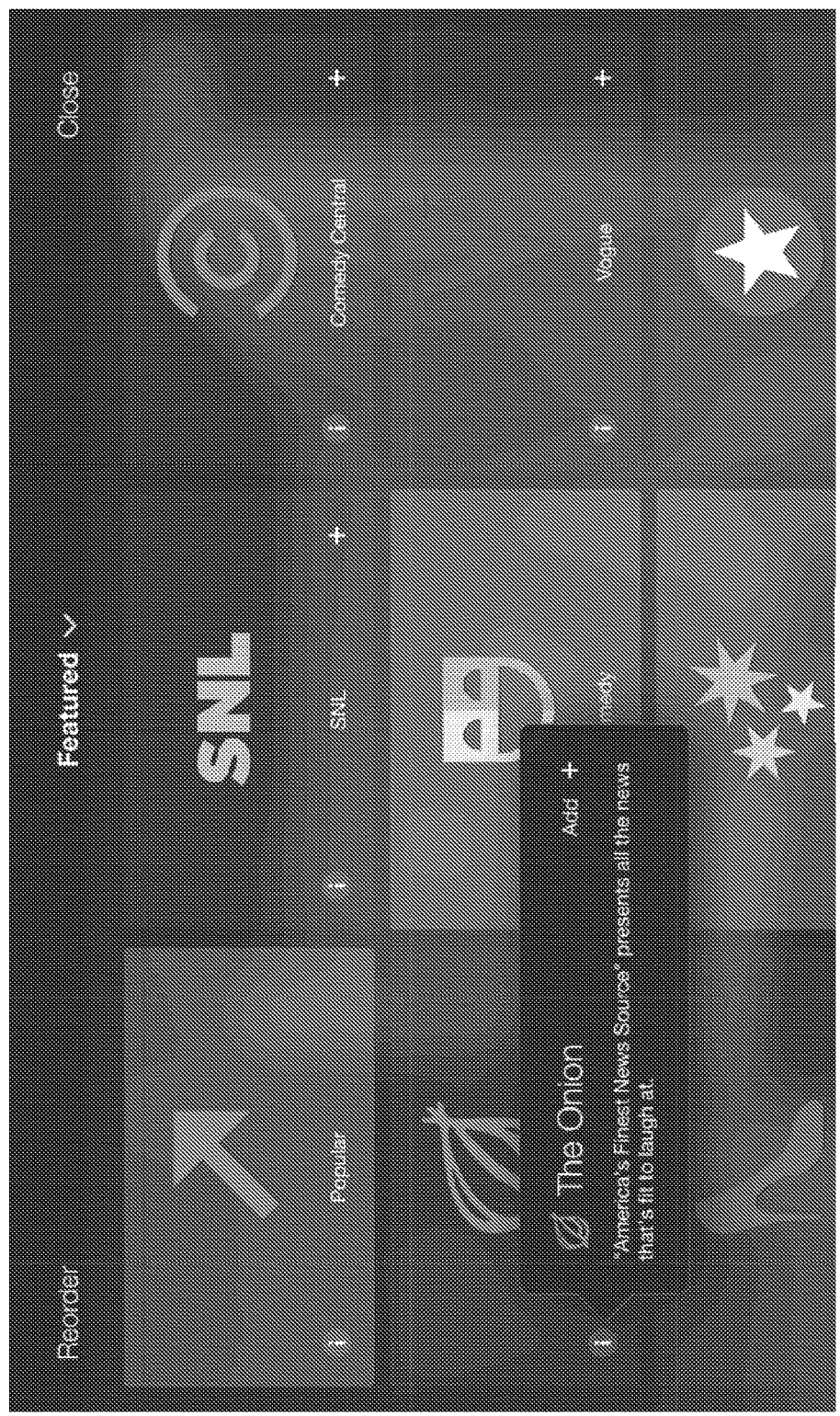
FIG. 3 shows a close-up example of the channel information feature, according to an embodiment of the present disclosure.

FIG. 3—Channel Store Commands.

FIG. 3 shows an example of one of the commands available with the Channel Store. For example, the information command, activated by tapping the "i" icon, provides general information about the programs associated with the channel. The channels can also be selected/deselected for the Channel Dock 150 from this screen.

Figure 6:
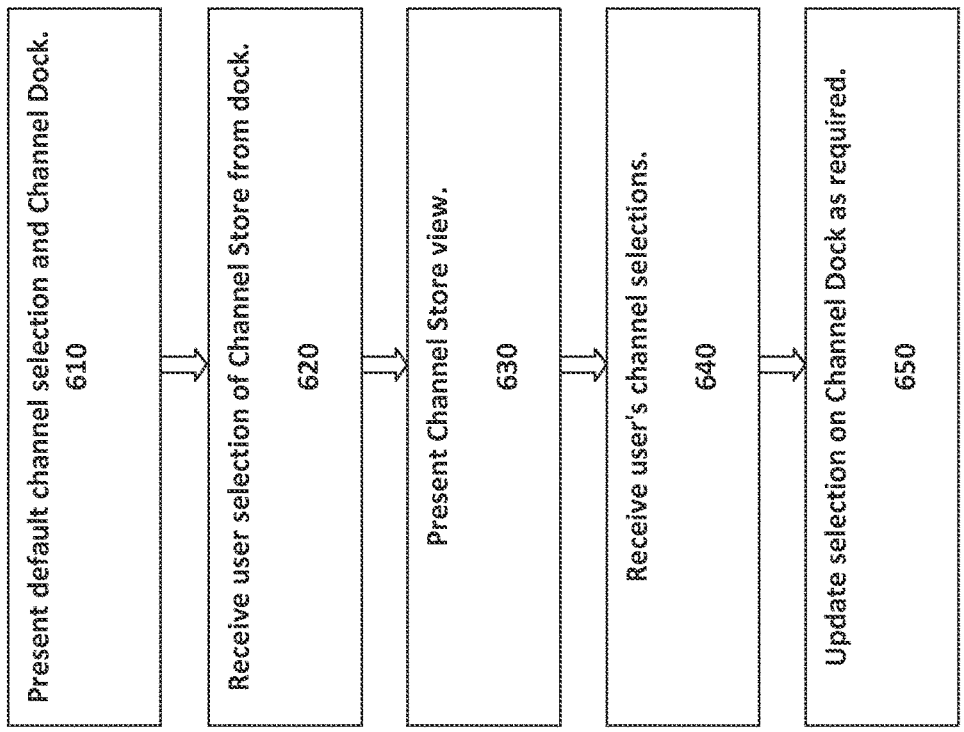
FIG. 6 is a high-level flowchart of a method for providing selectable channels, according to an embodiment of the present disclosure.

FIG. 6—High-Level View.

Referring to FIG. 6 there is shown a high-level flowchart of the Channel Dock 150 implementation, according to an embodiment of the present disclosure. Beginning with step 610, when the user first loads the Video App, a user interface including a Channel Dock 150 and a screen section 105 displaying a default channel selection (the core view shown in FIG. 1) is presented on the mobile device. This Channel Dock 150 is now, in essence, the user's remote control for video channels. Through interaction with the Channel Dock 150, the user is able to select channels to view and re-order them. It is possible that once the Video App is activated, a user simply interacts with the video channels loaded on the Channel Dock 150 without needing to access the Channel Store 110.

If, however, the user wishes to enter the Channel Store 110 by tapping the icon 155 on the Channel Dock 150, the system receives the user input in step 620. Responsive to this input, in step 630 the Channel Store View 110 is rendered on the user's device (see FIG. 2). The Channel Store View 110 presents a varied selection of currently popular ("trending") channels from different areas: sports, news, dramas, and the like. These default channels will vary according to viewing trends. In an alternate embodiment, it is possible to populate the Channel Dock 150 with default channels selected according to user profile parameters.

In step 640 the system receives the user's channel selections/deselections. Responsive to the user's selections, the Channel Dock 150 is updated to reflect the user's channel selections. For example, assume that the Channel Dock 150 is initialized with the video channels matching the icons 152 shown in FIG. 1 (SNL, Comedy, Gaming, PopSugar, Food, Celebrity, News, and the like). After perusing the Channel Store View 110, the user deselects "SNL" and selects Fashion & Beauty and "The Onion." The next time the Channel Dock 150 is rendered, it will show icons for the previous channels, plus icons for Fashion & Beauty and "The Onion" and will no longer show the icon for "SNL." The system will continue to respond to the user's customization (sorting, adding, deleting) in step 650 by re-configuring the Channel Dock 150.

Figure 7:
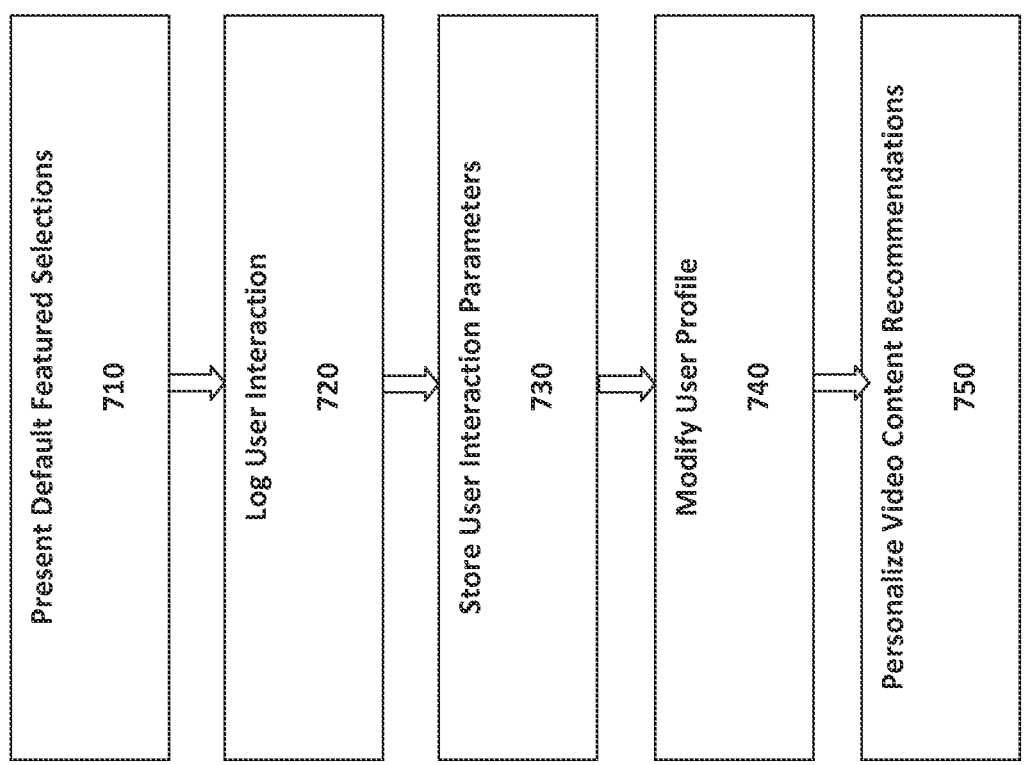
FIG. 7 is a flowchart of the learning method for channel recommendations, according to an embodiment of the present disclosure.

FIG. 7—Channel Learning—Referring now to FIG. 7, as the user interacts with the Channel Dock 150, it will "learn" the user's preferences and provide recommendations based on the learned preferences. For example, in step 710 the "Featured Selections" that the Channel Store View 110 graphical user interface initially presents to a user upon activation will default to a compendium of currently popular channels.

In step 720 the system logs the user's interactions with the Video App, in particular the consumption of the content items. More particularly, the user device (e.g., mobile device) can be configured to dynamically gather information with respect to content items that are consumed. This information may be similar to that recorded when users access content provided on a web site. More particularly, the information that is gathered via the user device may identify information source(s) and/or content item(s), indicate one or more characteristics of information source(s) and/or content item(s) being consumed, user data pertaining to the individual (e.g., user identifier), and/or other information (e.g., pertaining to interactions of third individual with information source(s), interactions of the individual with content item(s), and/or pertaining to circumstances surrounding the consumption of the content item(s)). For example, the information may indicate a number of times and/or period of time that the information source(s) and/or content item(s) have been accessed. Similarly, the information may indicate those information source(s) and/or content item(s) that have not been selected or consumed, or consumed for less than a threshold period of time.

In step 730 the user device can be configured to store the parameters of the user consumption. The user device can be configured to send this information to a remote server, which may store this information to a data store. Accordingly, user interactions with the user device or graphical user interface provided thereon may be tracked and recorded. The parameters of user consumption can include: the channel selected/deselected, the commands executed, the program viewed, the time of day that the program was viewed, and other parameters. After tracking the user's interactions with the Video App graphical user interface, in step 740 the system can update the user profile with the stored data to further personalize the user experience. For example, the user's profile can be updated to show a preference for sports videos when the user interaction indicates a greater than average selection of sports channels.

The characteristics of a content item such as a video may indicate information such as a primary subject or topic of the content item, one or more key words, results of analysis of the content item, one or more content categories indicating subject matter to which the content item relates (e.g., family, fear, comedy, drama), an identifier of the content item (e.g., URL, title, date, and/or information source), the content item or a portion thereof, and/or one or more individuals associated with the content item (e.g., author, actor(s), producer, director).

The characteristics of an information source such as a video channel may indicate information such as one or more content categories to which the information source relates. Such content categories may include, for example, sports, comedy, children, nature, animals, news, crime, science fiction, etc. For example, the characteristics may indicate that an information source pertains to sports where the information source is a sports channel.

As will be described in further detail below, the user device can obtain, collect, generate, or otherwise receive information that pertains to information sources and/or content items that are accessed via the graphical user interface of the user device such as a mobile device. This information may be stored, enabling content to be personalized for an individual (or a group of individuals) based, at least in part, upon one or more of the characteristics of the information sources, one or more characteristics of the content items, and/or a user profile of the individual (or group). For example, the user profile may indicate interactions of the individual with the information source(s) and/or content item(s) (e.g., number of clicks, number of times accessing a particular information source or content item, amount of time spent accessing the particular information source or content item, and/or circumstances surrounding the consumption of the information source or content item). Information that may be maintained in a user profile will be described in further detail below.

In step 750 the system uses the modified user profile to personalize video content recommendations to the user. One way this can be done is through the Featured Selections tab 135 shown in FIG. 2. The Featured Selections 135 can be updated to reflect the user's interests as recorded in the user profile. In addition, the Video App can present recommendations in the form of a message, blurb, or ticker tape.

Personalization of the user experience may include personalizing information sources and/or content items. Similarly, the personalization may include providing recommendations for information sources and/or content items. In some implementations, information source(s) and/or content item(s) may be recommended when the user accesses the Channel Store view 110. In other implementations, such a recommendation may be provided by altering the Video App interface presented to the user via the user device (e.g., mobile device). The recommendation may indicate a particular order or placement of the recommended information source(s) and/or content item(s) within the Channel Dock 150 (e.g., within the context of the user's pre-existing configuration preferences). For example, the recommended information source(s) and/or content item(s) may be highlighted using one or more display characteristics such as a different color, brightness, or text characteristics. The user may choose to accept the recommendation(s) or reject the recommendation(s).

Figure 8:
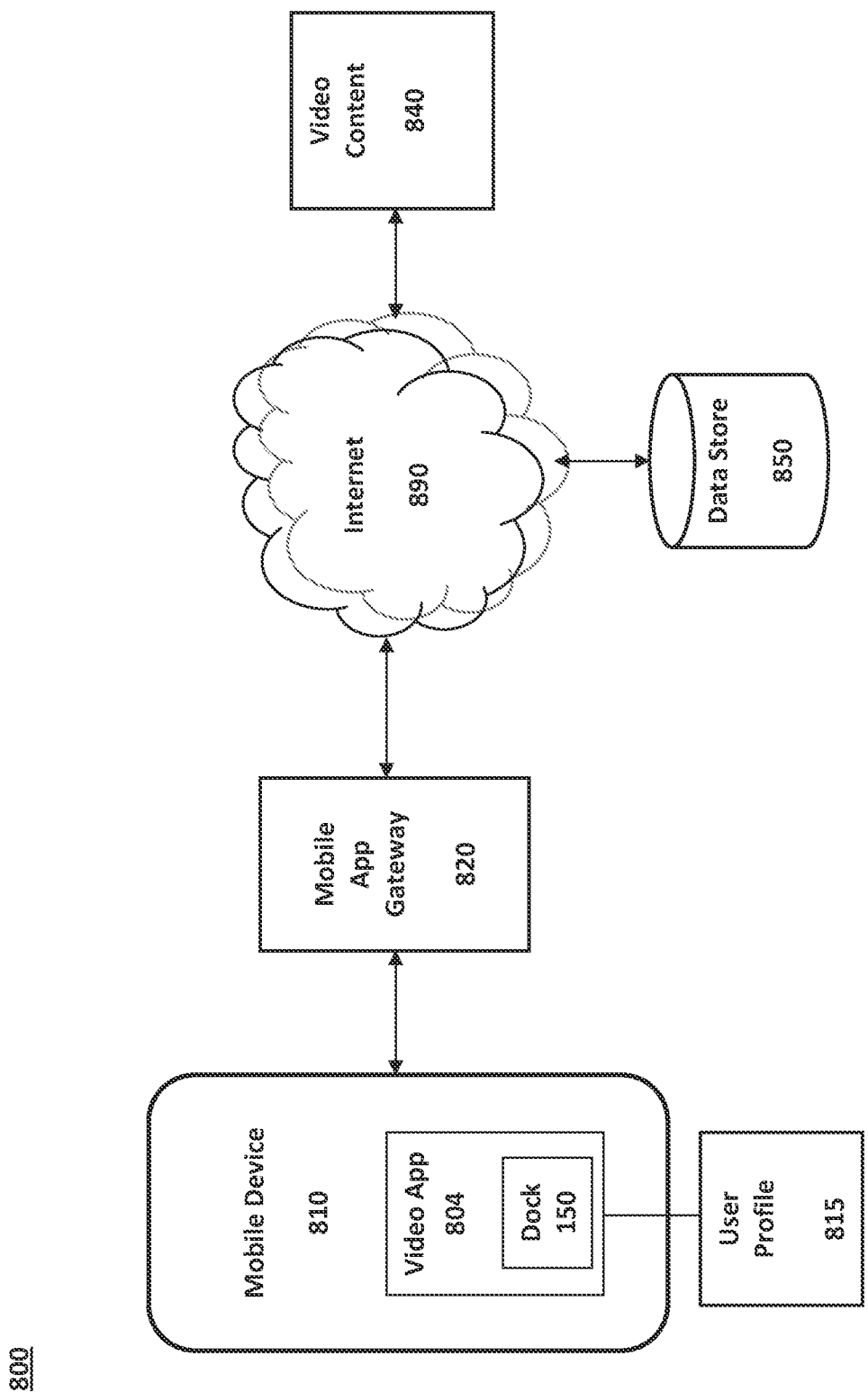
FIG. 8 is a high-level depiction of a system in which the Video App can be implemented, according to an embodiment of the present disclosure.

FIG. 8—High-Level System View.

Referring now to FIG. 8 we show a high-level depiction of a system 800 in which the Video App 804 can be implemented. The system 800 includes a mobile device 810 accessing the Internet 890 through a Mobile App Gateway 820. The Video App 804 is shown here as an application loaded on and operating within the mobile device 810. The User Profile 815 is accessed by and updated by the Video App 804. The user's interactions are stored in a Data Store 850 shown here as a remote data store. One with knowledge in the art will appreciate that the Data Store 850 can be implemented within the mobile device 810. The Video App 804 accesses video content 840 from at least one video source through the Internet 890.

The Data Store 850 may store digital content or references to digital content. The content can be indexed for efficient retrieval. In addition, the Data Store 850 may store information such as the characteristics of information sources and/or characteristics of the content, which may be stored in association with the content. More particularly, the content may be a collection of content or a specific content item, which may be one of a plurality of content items within a collection of content. For example, the characteristics of a content item may indicate information such as an a title or other identifier of the content item, date, a primary subject or topic of the content item, one or more key words, results of analysis of the content item, one or more categories indicating subject matter to which the content item relates (e.g., fear, drama, family, comedy), and/or one or more individuals associated with the content item (e.g., author, actor(s), producer, director). Similarly, the characteristics of an information source may indicate one or more content categories to which the information source relates.

Content and/or characteristics of content within a repository of media or multimedia within the Data Store 850 may be annotated. Examples of content may include text, images, audio, video, or the like, which may be processed or stored in memory. The term "annotation," as used herein, refers to descriptive or contextual content related to a content item, for example, collected from a web site and stored in association with the web site or the content item. Annotations may include various fields of descriptive content, such as a rating of a content item, circumstances or context pertaining to the consumption of a content item, a list of keywords or categories associated with a content item, etc.

In some embodiments, as an individual interacts with a software application or a device such as a mobile device, descriptive content such as, for example, a date and/or time, may be identified and stored in the Data Store 850 such that the descriptive content is stored in association with content. Descriptive content may also be stored along with contextual content. For example, how content came to be identified (e.g., it was contained in a web page or was accessed via a mobile device) may be stored in the Data Store 850 as contextual content associated with the content. Contextual content, therefore, may identify circumstances surrounding retrieval or consumption of content (e.g., date or time a content item was received or consumed and/or a source of the content item) and may be associated with descriptive content in the Data Store 850. Contextual content, may, for example, be used to subsequently search for associated descriptive content. For example, a search for content items that have been retrieved from a particular web site or consumed under specific circumstances may be identified.

In addition, the Data Store 850 may include account information (e.g., data) for a plurality of user accounts. Account information may include financial information such as credit card information, enabling goods or services provided in association with the account to be purchased. In addition, the account information may include information pertaining to goods or services available to the user via the user account or used by the user. More particularly, the account information may indicate an amount and/or quality of the goods or services available to the user or used by the user. In addition, the account information may indicate a cost associated with the amount and/or quality of goods or services available to the user or used by the user.

The account information may also include or be linked to additional information pertaining to the user. which can be found online. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). For example, the user profile may indicate a configuration of a graphical user interface, which may indicate configuration preferences established by the user, a default configuration, and/or configuration recommendations provided by the system. In addition, the user profile may be periodically updated as an individual consumes (e.g., views) content provided via a web site or via a graphical user interface such as that described herein while using a device such as a mobile device.

User Profile 815. A variety of mechanisms may be implemented to generate and/or update a user profile including, but not limited to, collecting or mining navigation history, stored documents, tags, or annotations, to provide a few examples. In addition, the user profile 815 may be updated with information gathered as a result of the use of the mobile device. A profile builder may store a generated or updated profile. Through the use of user profiles, for example, a web site such as a search engine provider may retrieve annotations, tags, stored pages, navigation history, or the like, which may be useful for making relevance determinations of search results. In addition, further content to be provided or recommended via a device such as a mobile device may be identified using the user profiles.

The user information tracked by the Video App 804 can include personal information such as demographic information and/or geographic information. Examples of demographic information include age and gender. Examples of geographic information include residence address, work address, and/or zip code. Each time an individual performs online activities such as clicking on a content item (e.g., an advertisement or media item), purchasing goods or services, sending messages, retrieving messages, accessing a media item, posting information or content, or annotating content, information regarding such activity or activities may be retained as user data. For instance, the user data that is retained may indicate the identity of web sites visited, identity of content items (e.g., videos or advertisements) and/or information sources that have been selected (e.g., clicked on) via the web site or a graphical user interface, and/or a timestamp indicating a date and/or time that the individual viewed or accessed the content item. Thus, the information may indicate whether the individual clicked on or viewed a content item (or information source) and, if so, the number of clicks or views within a particular time period and/or amount of time the content item (or information source) was accessed by the individual. An individual may be identified by a user ID (e.g., user account ID), information in a user cookie, Internet Protocol (IP) address, and the like.

In some embodiments, each time a user consumes content while using the mobile device such as that described herein, information regarding such activity may be retained as user data. More particularly, where a user consumes a content item such as a video while using the device, that information is associated with the user, where the information indicates: one or more characteristics of the content item, a date and/or time that the content item was consumed, information pertaining to interactions of the individual with the content item (e.g., an amount of time spent by the individual consuming the content item or number of times the content item was accessed), information pertaining to circumstances surrounding the consumption of the content item (e.g., weather, day of the week, time of year, etc.), and/or a user identifier. The characteristics of the content item may indicate information such as a title or other identifier of the content item, a date, one or more content categories indicating subject matter to which the content relates, a primary subject or topic of the content, one or more key words, one or more individuals associated with the content item (e.g., author, actor, producer, director), and/or other results of analysis of the content item.

While at least a portion of the information (e.g., an amount of time spent by the user consuming a particular content item) may be stored, information such as the characteristics of the content item may be stored in association with the content item. The information pertaining to the content item and/or information source may be associated with each of the users that have consumed (e.g., viewed) the particular content item (e.g., while using a mobile device) by linking the record(s) or information to the user profile of each of the users that have consumed the content item. For example, the user profile of each of the users that have consumed the content item may include a pointer to the record(s) or the information.

Based upon the information recorded in user profiles of individuals, a machine learning algorithm may learn how to identify characteristics of information sources and/or content items that may be of interest to individuals (or a similarly situated group of individuals) in the future. In some embodiments, a machine learning algorithm may be implemented to identify information sources and/or content items that may be of interest to the user. Such a machine learning algorithm may also assist in identifying an appropriate placement of a content item (or information source) within a web page or graphical user interface prior to the generation of the web page or the graphical user interface.

Figure 9:
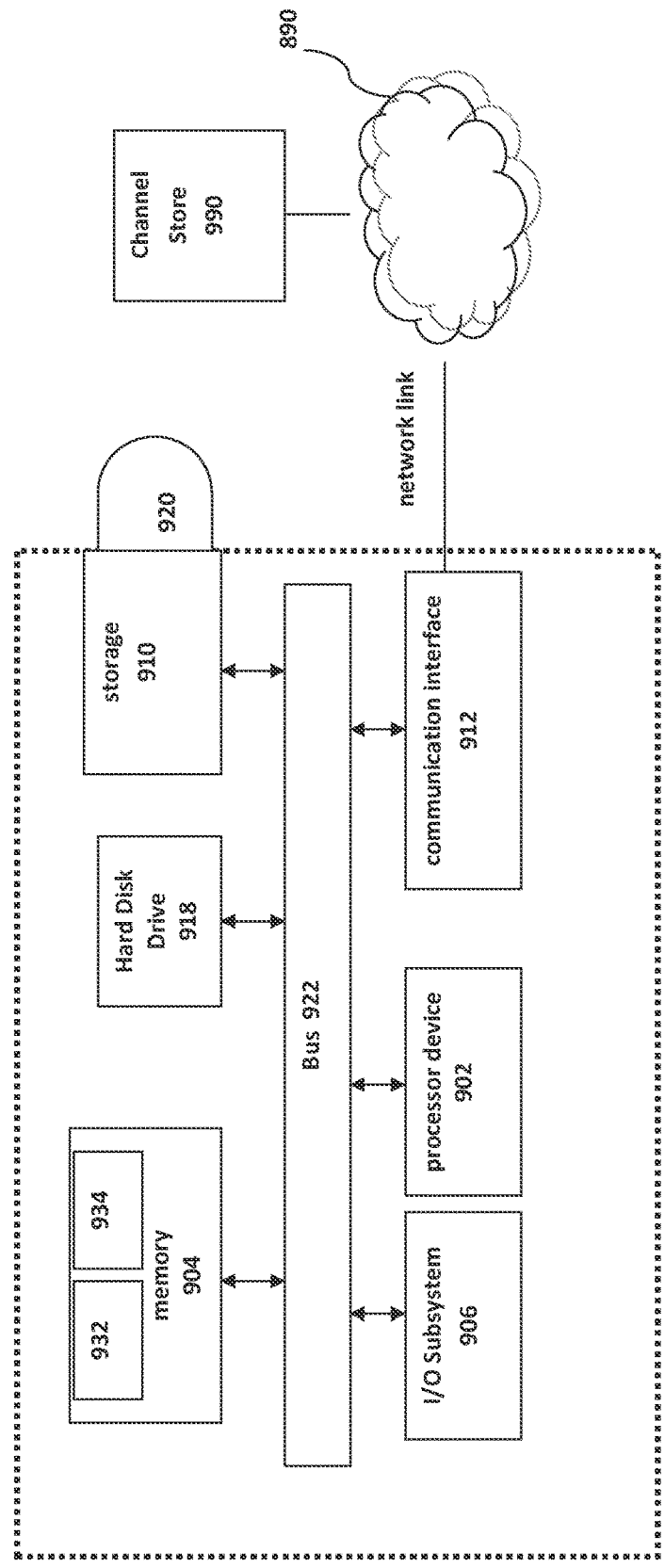
FIG. 9 is a high-level block diagram of the hardware components required to implement the channel view, according to an embodiment of the present disclosure.

FIG. 9 Hardware Embodiment.

Referring now to FIG. 9, there is provided a simplified pictorial illustration of the hardware requirements for generating and rendering the Video App 804 graphical user interfaces, in which the present disclosure may be implemented. For purposes of this invention, computer system 810 may represent any type of computer, information processing system or other programmable electronic device, including a client computer, a server computer, a portable computer, an embedded controller, a personal digital assistant, a Cloud computing device, and so on. The computer system 810 may be a stand-alone device or networked into a larger system. Computer system 810, illustrated for exemplary purposes as a mobile computing device, is in communication with other networked computing devices (not shown) via network 910. As will be appreciated by those of ordinary skill in the art, network 910 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 810. As will be appreciated by those of ordinary skill in the art, aspects of the invention may be distributed amongst one or more networked computing devices which interact with computer system 810 via one or more data networks such as, for example, network 910. However, for ease of understanding, aspects of the invention have been embodied in a single computing device—computer system 810.

Computer system 810 includes inter alia processing device 902 which communicates with an input/output subsystem 906, memory 904, storage 910 and network 910. The processor device 902 is operably coupled with a communication infrastructure 922 (e.g., a communications bus, crossover bar, or network). The processor device 902 may be a general or special purpose microprocessor operating under control of computer program instructions 932 executed from memory 904 on program data 934. The processor 902 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 904 may be partitioned or otherwise mapped to reflect the boundaries of the various memory subcomponents. Memory 904 may include both volatile and persistent memory for the storage of: operational instructions 932 for execution by CPU 902, data registers, application storage and the like. Memory 904 preferably includes a combination of random access memory (RAM), read only memory (ROM) and persistent memory such as that provided by a hard disk drive 918. The computer instructions/applications that are stored in memory 904 are executed by processor 902. The computer instructions/applications 932 and program data 934 can also be stored in hard disk drive 918 for execution by processor device 902.

The I/O subsystem 906 may include various end user interfaces such as a display, a keyboard, and a touch screen. The I/O subsystem 906 may further comprise a connection to a network such as a local-area network (LAN) or wide-area network (WAN) such as the Internet 890. Computer system 900 can access the Channel Store 990 through the Internet 890.

The computer system 810 may also include a removable storage drive 910, representing a floppy disk drive, a magnetic tape drive, an optical disk drive, etc. The removable storage drive 910 reads from and/or writes to a removable storage unit 920 in a manner well known to those having ordinary skill in the art. Removable storage unit 920, represents a floppy disk, a compact disc, magnetic tape, optical disk, CD-ROM, DVD-ROM, etc. which is read by and written to by removable storage drive 910. As will be appreciated, the removable storage unit 920 includes a non-transitory computer readable medium having stored therein computer software and/or data.

The computer system 810 may also include a communications interface 912. Communications interface 912 allows software and data to be transferred between the computer system and external devices. Examples of communications interface 912 may include a modem, a network interface (such as an Ethernet card), a communications port, a PCM-CIA slot and card, etc. Software and data transferred via communications interface 912 are in the form of signals which may be, for example, electronic, electromagnetic, optical, or other signals capable of being received by communications interface 912.

In this document, the terms "computer program medium," "computer usable medium," and "computer readable medium" are used to generally refer to both transitory and non-transitory media such as main memory 904, removable storage drive 1120, a hard disk installed in hard disk drive 918. These computer program products are means for providing software to the computer system 810. The computer readable medium 920 allows the computer system 810 to read data, instructions, messages or message packets, and other computer readable information from the computer readable medium 920.

Benefits and Advantages of the Video App 804 providing the Channel Dock 150.

1. Eliminates the need for a viewer to traverse a listing of hundreds of channels to find a channel of interest.

2. Viewers can sort and categorize their favorite channels for a more engaging and relevant viewing experience.

3. Channel selection/deselection is facilitated with a simple tap of the channel tile.

4. Channels can be re-ordered by dragging and dropping.

Monetization.

Some channels can be provided as pay channels. In addition, advertisements can be served within the channel tiles, providing the opportunity for advertising revenue.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method, comprising:
   providing, on a touch screen of a mobile device, a screen portion of a graphical user interface, the screen portion displaying digital video content from at least one of one or more digital video content sources (channels);
   providing, on the touch screen of the mobile device and adjacent the screen portion, a channel dock of the graphical user interface, the channel dock comprising:
      navigational tools for manipulating the one or more digital video content sources (channels);
      channel icons representing a selection of channels; and
      an icon selectable for accessing a virtual channel store;
   receiving, via the touch screen of the mobile device, user input comprising:
      a selection of a first channel icon, in the channel dock, corresponding to a first channel; and
      a selection of a second channel icon, in the channel dock, corresponding to a second channel;
   wherein the first channel icon and the second channel icon are displayed in a first sequential order, in a first direction, relative to each other in the channel dock;
   based upon the selection of the first channel icon and the selection of the second channel icon:
      modifying the screen portion of the graphical user interface to display a grid view concurrently comprising:
         a first row comprising two or more selectable tiles, corresponding to video content of the first channel, which are displayed along a first dimension of the graphical user interface, the first row occupying a first range of a second dimension of the graphical user interface; and
         a second row comprising two or more selectable tiles, corresponding to video content of the second channel, which are displayed along the first dimension of the graphical user interface, the second row occupying a second range of the second dimension of the graphical user interface;
         wherein the first row and the second row are displayed in the first sequential order, in a second direction, relative to each other in the second dimension of the graphical user interface, wherein the first direction is perpendicular to or the same as the second direction;
      displaying, in the channel dock concurrently with the display of the first row and the second row in the grid view, a highlighted version of the first channel icon, a highlighted version of the second channel icon and a non-highlighted version of a third channel icon for which a selection was not received;
         wherein at least one of the highlighted version of the first channel icon is displayed outside the first range of the second dimension or the highlighted version of the second channel icon is displayed outside the second range of the second dimension;
      receiving, while the grid view is displayed and via the touch screen of the mobile device, user input comprising a dragging and dropping of at least one of the first channel icon or the second channel icon in the channel dock;
      modifying the channel dock to display the channel icons re-ordered according to the dragging and dropping, wherein based upon the modifying the channel dock, the first channel icon and the second channel icon are displayed in a second sequential order, in the first direction, relative to each other in the channel dock, wherein the second sequential order is different than the first sequential order;

modifying the grid view to display the rows re-ordered according to the dragging and dropping, wherein based upon the modifying the grid view, the first row and the second row are displayed in the second sequential order, in the second direction, relative to each other;

receiving, via the touch screen of the mobile device, user input comprising a selection of the icon for accessing the virtual channel store;

presenting, on the touch screen of the mobile device, the virtual channel store as a grid of semi-transparent selectable channel tiles hovering over a screen of the mobile device and representing channels available in the virtual channel store, the grid comprising two or more columns of selectable channel tiles and two or more rows of selectable channel tiles, the presenting comprising concurrently presenting for display, within the grid of semi-transparent selectable channel tiles hovering over the screen of the mobile device:
  a first selectable channel tile, of the grid, concurrently presenting for display:
    a branded icon identifying a third channel represented by the first selectable channel tile,
    an information command icon,
    a textual description of the third channel, and
    a status icon indicating, via a first graphic, that the third channel is not selected for representation in the channel dock; and
  a second selectable channel tile, of the grid, concurrently presenting for display:
    a second branded icon identifying a fourth channel represented by the second selectable channel tile,
    a second information command icon,
    a second textual description of the fourth channel, and
    a second status icon indicating, via a second graphic different than the first graphic, that the fourth channel is selected for representation in the channel dock;

responsive to receiving, via the touch screen of the mobile device, a command associated with the first selectable channel tile:
  updating, on the touch screen of the mobile device, the channel dock to represent the third channel represented by the first selectable channel tile; and
  updating, on the touch screen of the mobile device, the first selectable channel tile to present for display an updated status icon indicating, via the second graphic, that the third channel is selected for representation in the channel dock; and responsive to receiving, via the touch screen of the mobile device, a second command associated with the second selectable channel tile:
  updating, on the touch screen of the mobile device, the channel dock to not represent the fourth channel represented by the second selectable channel tile; and
  updating, on the touch screen of the mobile device, the second selectable channel tile to present for display an updated second status icon indicating, via the first graphic, that the fourth channel is not selected for representation in the channel dock.

2. The method of claim 1, wherein the first direction is perpendicular to the second direction.

3. The method of claim 1, wherein the first direction is the same as the second direction.

4. The method of claim 1, comprising tracking one or more interactions with the channel dock.

5. The method of claim 4, comprising updating a user profile based upon the one or more interactions.

6. The method of claim 5, comprising providing content recommendations based upon the user profile.

7. The method of claim 1, wherein the receiving the command comprises determining a gesture on the touch screen of the mobile device.

8. An information processing system, comprising:
  a processor device; and
  a memory operably coupled with the processor device, the memory having computer-executable instructions for performing a method comprising:
    providing, on a touch screen of a device, a screen portion of a graphical user interface, the screen portion displaying digital video content from at least one of one or more digital video content sources (channels);
    providing, on the touch screen of the device and adjacent the screen portion, a channel dock of the graphical user interface, the channel dock comprising:
      navigational tools for manipulating the one or more digital video content sources (channels);
      channel icons representing a selection of channels; and
      an icon selectable for accessing a virtual channel store;
    receiving, via the touch screen of the device, user input comprising:
      a selection of a first channel icon, in the channel dock, corresponding to a first channel; and
      a selection of a second channel icon, in the channel dock, corresponding to a second channel;
      wherein the first channel icon and the second channel icon are displayed in a first sequential order, in a first direction, relative to each other in the channel dock;
    based upon the selection of the first channel icon and the selection of the second channel icon:
      modifying the screen portion of the graphical user interface to display a grid view concurrently comprising:
        a first row comprising two or more selectable tiles, corresponding to video content of the first channel, which are displayed along a first dimension of the graphical user interface, the first row occupying a first range of a second dimension of the graphical user interface; and
        a second row comprising two or more selectable tiles, corresponding to video content of the second channel, which are displayed along the first dimension of the graphical user interface, the second row occupying a second range of the second dimension of the graphical user interface;
        wherein the first row and the second row are displayed in the first sequential order, in a second direction, relative to each other in the second dimension of the graphical user interface, wherein the first direction is perpendicular to or the same as the second direction;
      displaying, in the channel dock concurrently with the display of the first row and the second row in the grid view, a highlighted version of the first channel icon, a highlighted version of the second channel icon and a non-highlighted version of a third channel icon for which a selection was not received;
        wherein at least one of the highlighted version of the first channel icon is displayed outside the first range of the second dimension or the highlighted version of the second channel icon is displayed outside the second range of the second dimension;

receiving, while the grid view is displayed and via the touch screen of the device, user input comprising a dragging and dropping of at least one of the first channel icon or the second channel icon in the channel dock;

modifying the channel dock to display the channel icons re-ordered according to the dragging and dropping, wherein based upon the modifying the channel dock, the first channel icon and the second channel icon are displayed in a second sequential order, in the first direction, relative to each other in the channel dock, wherein the second sequential order is different than the first sequential order;

modifying the grid view to display the rows re-ordered according to the dragging and dropping, wherein based upon the modifying the grid view, the first row and the second row are displayed in the second sequential order, in the second direction, relative to each other;

receiving, via the touch screen of the device, user input comprising a selection of the icon for accessing the virtual channel store;

presenting, on the touch screen of the device, the virtual channel store as a grid of semi-transparent selectable channel tiles hovering over a screen of the device and representing channels available in the virtual channel store, the grid comprising two or more columns of selectable channel tiles and two or more rows of selectable channel tiles, the presenting comprising concurrently presenting for display, within the grid of semi-transparent selectable channel tiles hovering over the screen of the device:
a first selectable channel tile, of the grid, concurrently presenting for display:
a branded icon identifying a third channel represented by the first selectable channel tile,
an information command icon,
a textual description of the third channel, and
a status icon indicating, via a first graphic, that the third channel is not selected for representation in the channel dock; and
a second selectable channel tile, of the grid, concurrently presenting for display:
a second branded icon identifying a fourth channel represented by the second selectable channel tile,
a second information command icon,
a second textual description of the fourth channel, and
a second status icon indicating, via a second graphic different than the first graphic, that the fourth channel is selected for representation in the channel dock;

responsive to receiving, via the touch screen of the device, a command associated with the first selectable channel tile:
updating, on the touch screen of the device, the channel dock to represent the third channel represented by the first selectable channel tile; and
updating, on the touch screen of the device, the first selectable channel tile to present for display an updated status icon indicating, via the second graphic, that the third channel is selected for representation in the channel dock; and responsive to receiving, via the touch screen of the device, a second command associated with the second selectable channel tile:
updating, on the touch screen of the device, the channel dock to not represent the fourth channel represented by the second selectable channel tile; and
updating, on the touch screen of the device, the second selectable channel tile to present for display an updated second status icon indicating, via the first graphic, that the fourth channel is not selected for representation in the channel dock.

9. The information processing system of claim 8, wherein the first direction is perpendicular to the second direction.

10. The information processing system of claim 8, wherein the first direction is the same as the second direction.

11. The information processing system of claim 8, the method comprising tracking one or more interactions with the channel dock.

12. The information processing system of claim 11, the method comprising updating a user profile based upon the one or more interactions.

13. The information processing system of claim 12, the method comprising providing content recommendations based upon the user profile.

14. The information processing system of claim 8, wherein the receiving the command comprises determining a gesture on the touch screen of the device.

15. A computer program product comprising a non-transitory computer readable medium with computer-executable instructions stored thereon, the computer-executable instructions for performing a method comprising:

providing, on a touch screen of a device, a screen portion of a graphical user interface, the screen portion displaying digital video content from at least one of one or more digital video content sources (channels);

providing, on the touch screen of the device and adjacent the screen portion, a channel dock of the graphical user interface, the channel dock comprising:
navigational tools for manipulating the one or more digital video content sources (channels);
channel icons representing a selection of channels; and
an icon selectable for accessing a virtual channel store;

receiving, via the touch screen of the device, user input comprising:
a selection of a first channel icon, in the channel dock, corresponding to a first channel; and
a selection of a second channel icon, in the channel dock, corresponding to a second channel;
wherein the first channel icon and the second channel icon are displayed in a first sequential order, in a first direction, relative to each other in the channel dock;

based upon the selection of the first channel icon and the selection of the second channel icon:
modifying the screen portion of the graphical user interface to display a grid view concurrently comprising:
a first row comprising two or more selectable tiles, corresponding to video content of the first channel, which are displayed along a first dimension of the graphical user interface, the first row occupying a first range of a second dimension of the graphical user interface; and
a second row comprising two or more selectable tiles, corresponding to video content of the second channel, which are displayed along the first dimension of the graphical user interface, the second row occupying a second range of the second dimension of the graphical user interface;

wherein the first row and the second row are displayed in the first sequential order, in a second direction, relative to each other in the second dimension of the graphical user interface, wherein the first direction is perpendicular to or the same as the second direction;

displaying, in the channel dock concurrently with the display of the first row and the second row in the grid view, a highlighted version of the first channel icon, a highlighted version of the second channel icon and a non-highlighted version of a third channel icon for which a selection was not received;

wherein at least one of the highlighted version of the first channel icon is displayed outside the first range of the second dimension or the highlighted version of the second channel icon is displayed outside the second range of the second dimension;

receiving, while the grid view is displayed and via the touch screen of the device, user input comprising a dragging and dropping of at least one of the first channel icon or the second channel icon in the channel dock;

modifying the channel dock to display the channel icons re-ordered according to the dragging and dropping, wherein based upon the modifying the channel dock, the first channel icon and the second channel icon are displayed in a second sequential order, in the first direction, relative to each other in the channel dock, wherein the second sequential order is different than the first sequential order;

modifying the grid view to display the rows re-ordered according to the dragging and dropping, wherein based upon the modifying the grid view, the first row and the second row are displayed in the second sequential order, in the second direction, relative to each other;

receiving, via the touch screen of the device, user input comprising a selection of the icon for accessing the virtual channel store;

presenting, on the touch screen of the device, the virtual channel store as a grid of semi-transparent selectable channel tiles hovering over a screen of the device and representing channels available in the virtual channel store, the grid comprising two or more columns of selectable channel tiles and two or more rows of selectable channel tiles, the presenting comprising concurrently presenting for display, within the grid of semi-transparent selectable channel tiles hovering over the screen of the device:

a first selectable channel tile, of the grid, concurrently presenting for display:
 a branded icon identifying a third channel represented by the first selectable channel tile,
 an information command icon,
 a textual description of the third channel, and
 a status icon indicating, via a first graphic, that the third channel is not selected for representation in the channel dock; and a second selectable channel tile, of the grid, concurrently presenting for display:
 a second branded icon identifying a fourth channel represented by the second selectable channel tile,
 a second information command icon,
 a second textual description of the fourth channel, and
 a second status icon indicating, via a second graphic different than the first graphic, that the fourth channel is selected for representation in the channel dock;

responsive to receiving, via the touch screen of the device, a command associated with the first selectable channel tile:
 updating, on the touch screen of the device, the channel dock to represent the third channel represented by the first selectable channel tile; and
 updating, on the touch screen of the device, the first selectable channel tile to present for display an updated status icon indicating, via the second graphic, that the third channel is selected for representation in the channel dock; and responsive to receiving, via the touch screen of the device, a second command associated with the second selectable channel tile:
 updating, on the touch screen of the device, the channel dock to not represent the fourth channel represented by the second selectable channel tile; and
 updating, on the touch screen of the device, the second selectable channel tile to present for display an updated second status icon indicating, via the first graphic, that the fourth channel is not selected for representation in the channel dock.

16. The computer program product of claim 15, wherein the first direction is perpendicular to the second direction.

17. The computer program product of claim 15, wherein the first direction is the same as the second direction.

18. The computer program product of claim 15, the method comprising tracking one or more interactions with the channel dock.

19. The computer program product of claim 18, the method comprising updating a user profile based upon the one or more interactions.

20. The computer program product of claim 19, the method comprising providing content recommendations based upon the user profile.

* * * * *